Sept. 23, 1952          C. OTTO          2,611,739

RECOVERING ACID AND BENZOL FROM BENZOL WASHING RESIDUES

Filed Dec. 22, 1949          2 SHEETS—SHEET 1

Fig. 1.

INVENTOR
CARL OTTO

BY
John E. Hubbell
ATTORNEY

Sept. 23, 1952 C. OTTO 2,611,739
RECOVERING ACID AND BENZOL FROM BENZOL WASHING RESIDUES
Filed Dec. 22, 1949 2 SHEETS—SHEET 2
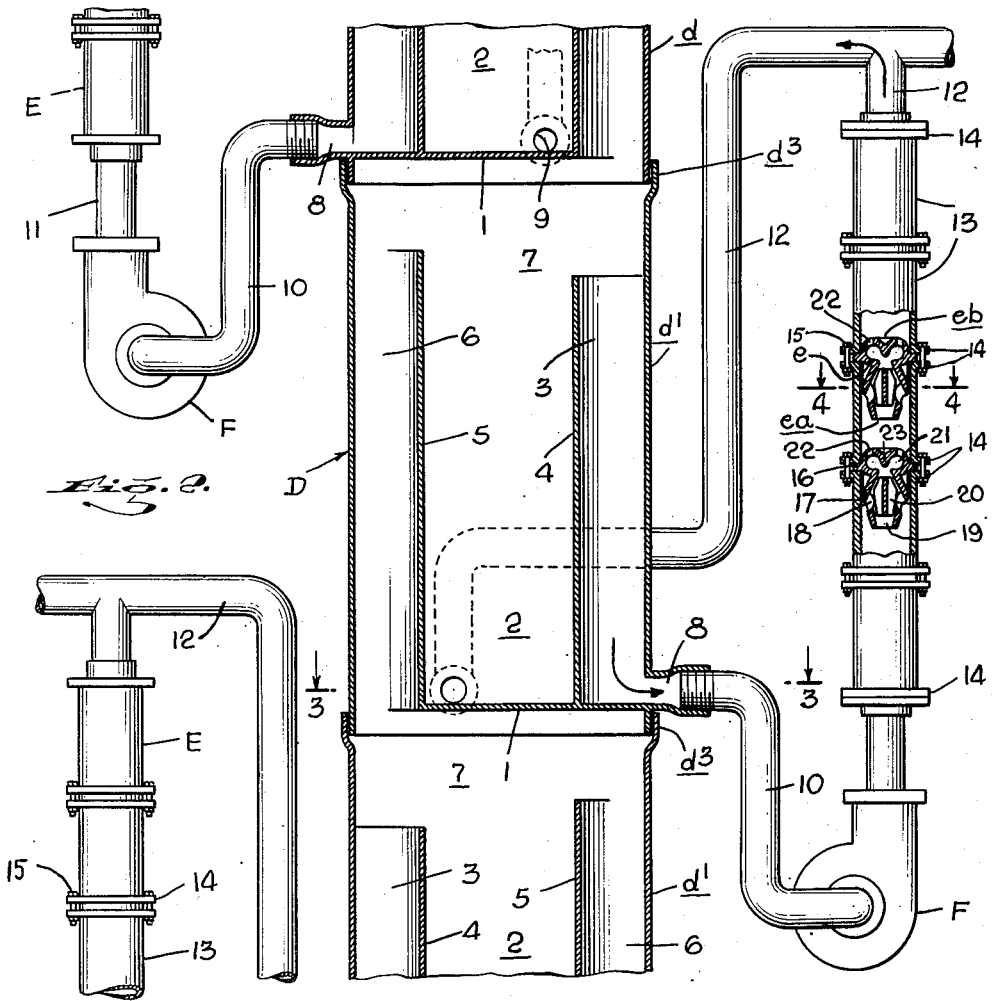
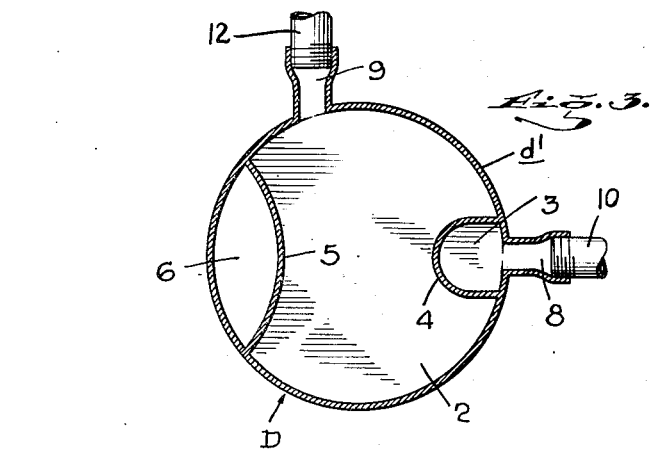
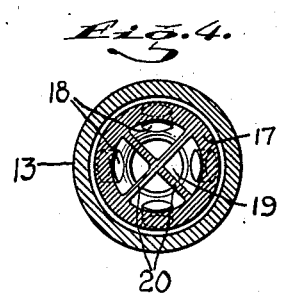
INVENTOR
CARL OTTO
BY John E. Hubbell
ATTORNEY Patented Sept. 23, 1952

2,611,739

UNITED STATES PATENT OFFICE 2,611,739

RECOVERING ACID AND BENZOL FROM BENZOL WASHING RESIDUES

Carl Otto, Manhasset, N. Y.

Application December 22, 1949, Serial No. 134,391

4 Claims. (Cl. 202—46)

The general object of the present invention is to provide an improved method of, and improved apparatus for recovering valuable constituents from spent reagent material employed in the recovery of benzol from distillation gas.

Most of the many by-product coke oven plants now in use include apparatus for separating benzol from the coke oven gas and eliminating impurities from the benzol. In general, the recovery and purification of the benzol involves the step of scrubbing the distillation gas by a hydrocarbon wash oil having a relatively high boiling point and in which most of the benzol constituents of the gas is absorbed during the scrubbing operation. The bulk of the benzol constituents which are thus absorbed by the wash oil are then separated in vapor form from the wash oil by distillation. The benzol vapors thus produced are then condensed and the condensate is purified by scrubbing or washing it with concentrated sulphuric acid and thereafter scrubbing or washing it with a caustic solution.

In the acid washing treatment, unsaturated hydro-carbons in the benzol condensate are converted into high boiling point compounds which with other impurities separated from the condensate are retained in the residue from which the acid washed benzol condensate is separated. That residue also includes the bulk of the sulphuric acid used in the acid washing process and is commonly known as and is hereinafter usually referred to as, "spent acid." That residue is also known as acid tar and acid sludge. The primary purpose of the caustic washing of the benzol is to neutralize sulphur compounds in the acid washed benzol. The residue of the caustic washing process while still possessing caustic properties is not suitable for reuse in benzol washing and is commonly referred as spent caustic.

The quantity of sulphuric acid used in washing the benzol is relatively large and its cost constitutes a substantial fraction of the total cost of the benzol recovery. The spent acid in its initial condition is not suitable for reuse as a benzol washing agent, and is not practically usable as a source of sulphuric acid for other purposes. Various methods of reclaiming dilute but relatively pure sulphuric acid from the spent acid residue have been proposed from time to time and some use of some of those methods has been made. In the methods so used, it is the usual practice to separate more or less of the acid from a sludge residue and then burn that residue or pass it to waste. In many by-product coke oven plants it is still regular practice however to discard the spent acid as waste material, although its noxious character frequently makes its disposal to waste a troublesome matter.

A specific object of the present invention is to provide a simple and effective method of, and apparatus for so treating the spent acid and spent caustic residues of the above described benzol condensate washing processes, as to recover the considerable benzol constituents of said residues free from objectionable sulphur contamination, and to make possible the ready gravitational separation of the spent acid into relatively pure though dilute sulphuric acid and a sludge or residue including resinous and/or carbonaceous substances.

A more specific object of the invention is to provide a column still having provisions for subjecting the acid tar to steaming and agitation actions in each of a plurality of superposed sections, the acid tar successively overflowing from each upper section into the subjacent section, combined with means external to the column and including a pump and one or more mixing nozzles for continuously withdrawing the acid sludge from each section and returning it thereto after efficiently remixing the sludge by passing it through the mixing nozzles.

Although the sulphuric acid thus recovered is too dilute for reuse in washing benzol condensates, its strength is sufficient for some practically important uses, and in particular for use as bath liquor in saturators employed to recover ammonia in the form of ammonia sulphate from coke oven gas.

The various features of novelty which characterize my invention are pointed out with particularity in the claims annexed to and forming a part of this specification. For a better understanding of the invention, however, its advantages, and specific objects attained by its use, reference should be had to the accompanying drawing and descriptive matter in which I have illustrated and described preferred embodiments of the invention.

Of the drawings:

Fig. 1 is a diagrammatic showing of an acid reclaiming plant;

Fig. 2 is an enlarged scale elevation in section of a portion of the spent acid still shown in Fig. 1;

Fig. 3 is a section on the line 3—3 of Fig. 1; and

Fig. 4 is a section on the line 4—4 of Fig. 2.

In Fig. 1, I have diagrammatically illustrated acid and benzol recovery apparatus embodying the present invention, and comprising a reservoir or tank A receiving spent acid through a pipe $A^1$ from the acid washing apparatus of a benzol recovery plant (not shown). The term "benzol" is used herein in accordance with the terminology of the coke oven art, to generically include light oil constituent toluol, xylol and solvent-naphtha, as well as the chemical substance benzol. Spent acid is withdrawn from the tank A by a pump B and discharged by the latter through a pipe C into the top of a distilling column D. The latter as shown comprises a plurality of superposed column sections including a top section $d$, one or more intermediate sections $d'$, two being shown, and a bottom section $d''$. The column D is provided with an uprising vapor outlet nozzle D' at the upper end of the top section $d$, and with a depending liquid and residue discharge outlet $D^2$ at the lower end of the lower section $d'''$. Each of the sections $d$, $d'$, and $d''$ is provided with an individual recirculating and agitating mechanism comprising an agitating or mixing device E and a pump F for drawing the fluent material undergoing treatment from the associated section passing the liquor through the device E and returning it to the column section from which it was withdrawn. Steam is supplied to each of the column sections by a corresponding pipe G.

A vapor pipe H connects the vapor outlet nozzle D of the column D to the inlet J' of a second distilling column J. The latter may be a bubble still of any usual type with a bubble tray in each of a plurality of superposed column sections, and having an upper vapor outlet $J^2$, a lower steam inlet $J^3$ and a lower outlet $J^4$ for the liquid residue to be discharged to waste. Spent caustic liquor from a caustic benzol washer (not shown) may be supplied to the upper end of the column J through a pipe K. The benzol vapors entering the column still J through the pipes H and K, and purified therein by the spent caustic liquor entering the still J through the pipe K, pass from the vapor outlet $J^2$ at the upper end of the column through a vapor pipe L to a condenser M. The latter has an outlet M' for uncondensed gas at its upper end, and an outlet $M^2$ at its lower end discharging condensate into a receptacle O. The latter serves as a gravity type water and light oil separator, and as a liquid seal chamber for the condenser outlet $M^2$. The receptacle O is provided with an upper outlet O' for benzol and a lower outlet $O^2$ for water. The material discharged at the lower end of the distilling column D through the outlet $D^2$, is received in a receptacle P in which the relatively heavy dilute sulphuric acid recovered separates from the relatively light residue which is in the form of sludge including resinous or carbonaceous particles. The latter may be skimmed off and the acid may be withdrawn through the valved draw off pipe P'.

As shown, a pipe Q and its valved branch Q' form a means through which a dilute solution of ammonium sulphate in sulphuric acid may be supplied in some cases, to the upper end of the column still D for use therein as a washing liquor. As shown, the pipe Q has a second valved branch $Q^2$ through which such a solution may be passed into the lower portion of the lower section $d''$ of the column still D to dilute and increase the volume of the sulphuric acid recovered and thus facilitate its separation from the sludge or residue in the receptacle P. In practice, when such a dilute solution is supplied, it will ordinarily be "mother liquor" drawn from the associated saturator section of the by-product plant which also includes the benzol recovery apparatus. In the saturator plant section of the plant, the ammonia content of coke oven gas is recovered as ammonium sulphate by scrubbing the gas with an acidified dilute ammonium sulphate solution. The dilution of the sulphuric acid in the lower portion of the column D by the addition thereto of mother liquor, also serves to reduce the corrosive action of the sulphuric acid on the piping and other apparatus through which the acid is moved into the saturator or other apparatus in which the acid is used.

In the form of the column still D shown, all of the sections $d$, $d'$, and $d''$ are operatively alike. Each intermediate section $d'$ is enlarged at its upper end to form a bell end or socket portion $d^3$ which receives the spigot end of the section above it, and is formed at its lower end with a spigot end portion received in the bell end portion $d^3$ of the subjacent column section. The upper end column section $d$, differs from each intermediate section in having its upper end closed except for the port or passage in the central uprising nozzle D'. The lower column section $d''$ differs from each intermediate section in that its lower end is closed except for the port or passage in the elongated depending central nozzle portion $D^2$. The sections $d$, $d'$, and $d''$ may be, and as shown, are alike in the manner in which their internal space is subdivided and in that they are formed of material, such as high silicon iron, which is suitably resistant to the corrosive action of the material passing through the column.

As shown, each column section comprises a horizontal partition 1, which forms the bottom walls of a main central compartment 2, and of a smaller compartment 3 at one side of the compartment 2. The compartments 2 and 3 are open at their upper ends and are separated from one another by a vertical partition wall 4. A vertical partition wall 5 at the opposite side of the compartment 2 from the partition 4, separates the latter from a vertical open ended passage or thoroughfare 6. The partition 4 is preferably shorter than the partition 5. A space 7 in the upper portion of each of the sections $d$, $d'$, and $d''$, provides free communication between the upper ends of the thoroughfare 6 and the compartments 2 and 3 in the same column section. The thoroughfare 6 in each of the column sections, except the lowermost section $d''$, is in communication at its lower end with the open space 7 in the subjacent section. The lower column $d''$ is formed with a space $7_a$ through which the thoroughfare 6 of the section communicates with the outlet passage $D^2$. As shown, the adjacent sections are reversed so that the thoroughfare passage 6 in each upper section is at the opposite side of the still from the thoroughfare passage 6 in the immediately subjacent section, the two thoroughfare passages being in communication through the space 7 of the subjacent section.

In the form shown, each of the column sections $d$, $d'$, and $d''$ is formed with an outlet 8 opening from the lower portion of the compartment 3, and with an inlet 9 opening to the lower portion of the compartment 2 of the section. The outlet 8 is connected by a pipe 10 to the inlet of the corresponding pump F. The discharge outlet of the pump F is connected by a pipe 11 to the lower end of the corresponding agitating or mixing device E, and the upper end of the latter is connected by a pipe 12 to the inlet 9 of the column section. Advantageously, and as shown, the device E is a mixing nozzle structure of the well known type disclosed in the Jacobsen Patent 1,637,697, of August 2, 1927. As shown, the device E comprises five cylindrical pipe sections 13, each formed with an out-turned flange 14 at each end, and with bolt holes through each flange for clamping bolts 15. The flanges 14 at the remote ends of the device E are connected to end heads 14' through which the ends of the device are mechanically coupled to the pipes 11 and 12. Each two adjacent flanged ends 14 intermediate the ends of the device E have clamped between them the circumferential rib or flange portion 16 of a corresponding mixing nozzle element e.

As shown, each nozzle element e is a one piece casting of high silicon iron or other metallic alloy suitably resistant to corrosion, and comprises an inlet section ea at one side, and a mixing portion eb at the other side of its flange portion 16. The inlet portion ea comprises an intermediate ring like portion 17 fitting easily in the surrounding pipe section as shown in Fig. 4, and a tapered portion at the inlet end of said ring portion, and is formed with inclined inlet passages 18 and a main central inlet passage 19. The portion end of the main inlet passage 19 adjacent the flange 16 diminishes in cross section as it approaches the mixing portion eb'. A pair of transverse partitions 20 divided the main inlet passage into four parts as is clearly shown in Fig. 4. The mixing portion eb comprises a cavity or circular chamber 21 partly surrounded by the flange 16 and into which the reduced end of the main inlet passage opens. The wall at the side of the passage 21 remote from the inlet portion ea is formed with four cylindrical outlet openings 22. A central conical projection 23 from the front wall of the chamber 21 of the outlet portion eb, faces the passage 19 and the partitions 20.

The material to be mixed flowing toward the inlet end ea of a nozzle member enters the openings 18 and 19 and is broken into a plurality of streams by the partition 20. Those streams are brought together in the tapering forwarding end of the inlet passage and are discharged into the cavity 21 with increased velocity. The four streams which are thus projected into the cavity 21, are given a violent swirling motion in the direction of the arrows shown in Fig. 1. The streams thus thoroughly mixed are then discharged through the openings 22 at a high velocity and the flowing material is further mixed as the jets discharged through the separate outlet openings 22 recombine. Each nozzle element by thus repeatedly changing the velocity and direction of movement of the streams flowing through it, causes a very intimate mixing of the stream material. Conveniently, and as shown, the steam supply pipe G associated with each of the still sections d, d', and d'', is arranged to discharge into the pipe portion 11 through which liquor is returned from the device E to the lower portion of the corresponding central compartment 2.

In normal operation of the apparatus illustrated, the acid tar or sludge from which benzol and dilute sulphuric acid are to be recovered is supplied through the pipe C to the space 7 above the compartments 2 and 3 in the upper section d of the column still D. The fluent material thus supplied to said space 7 mixes therein with the flowing material constantly being returned to the space 2 or section d from the mixing device E. The material thus passed into the upper end of the column section d, including the steam injected into the material flowing into the compartment 2 through the pipe 12, produce a seething or ebullient mass of material tending to separate into a relatively heavy liquid constituent and a resinous and/or carbonaceous constituent of relatively light weight. In regular operation, the relatively light weight constituent and the relatively liquid constituent are being continuously spilled over the partition 5 of each section into the adjacent thoroughfare 6 through which the vapors formed pass upward and through which the unvaporized material pass downwardly.

The action in each lower section of the column D is essentially the same as the action in the top section d, except as the steaming, recirculation and mixing treatments to which the material is subjected, progressively vaporizes and reduces the benzol content of the material, and progressively increases the amounts of definitely distinct relatively heavy acid and relatively light residue constituents of the material passing down to the still outlet $D^2$. As will be understood, with apparatus suitably designed and operated, substantially all of the benzol and other light oils in the material passing to the column D through the pipe C, will be liberated and discharged through the pipe H, and substantially all of the sulphuric acid content of the material supplied to the still D through the pipe C will pass out of the column through the outlet $D^2$ into the receptacle P, so that the acid may be readily separated from the non-acid residue passing into said receptacle.

The compartments 2 and 3 of each of the still sections d, d', and d'', form parts of a treatment space which is individual to the corresponding section and continuously receives material to be treated through the upper space 7 of the section. The unvaporized material treated in said space continuously flows away from the space over the weir formed by the partition wall 5 separating said space from the adjacent thoroughfare 6 through which said unvaporized material passes downwardly away from the section. The portion of the material treated in each section which is vaporized therein, passes upwardly away from the treatment space through the space 7 of the section. The treatment to which the material is subjected while passing through each of the sections d, d', and d'', comprises a vigorous boiling action, effected in the treatment space, and in which the material is agitated and heated to a temperature which is substantially above the boiling temperature of water and may be of the order of 140° C. The boiling action thus effected results from the passage of steam into the section through the corresponding pipes G and 12.

The compartments 2 and 3 of each section also form parts of a recirculation flow path closed on itself, and including the associated pipes 10 and 12, the pump F, and the mixing device E through which the recirculated material rapidly passes away from the compartment 3 and back into the compartment 2. In passing rapidly through the mixing nozzles e of the device E, the material is violently agitated and sub-divided and remixed as previously described.

My improved method and apparatus provides simple and economical solution of the problem of how to dispose of spent acid and spent caustic residues from benzol recovery portion of a by-product coke oven plant. Heretofore, it has been the custom in many by-product plants to waste such residues. Frequently, by burning them to avoid the ill effects of passing such noxious residues to a sump or analogous receiver for waste material. With the present invention, the floating residue separated from the acid passing into the receptacle P is relatively small in amount and of a relatively non-noxious character so that its disposal is not a serious matter. Moreover, the value of the acid and benzol recovered is substantial. In a recent laboratory test of spent acid furnished me by a large steel producer to determine the amounts of acid and benzol which can be recovered from 370 grams of spent acid having a specific gravity of 1.63 that by boiling said acid for about one hour and raising the temperature of the acid to 140° C., I was able to recover 300 grams of dilute sulphuric acid having a density of 1.49 corresponding to 47.7 Bé. The residue floating on top of the reclaimed acid weighed 77 grams and consisted mainly of granulated carbonaceous material. In addition, approximately three cubic centimeter of benzol and other light oil constituents were recovered.

The benzol vapors passing from the column still D into the bubble still or column J through the pipe H, will normally carry with them various sulphur compounds, including $SO_2$, $SO_3$, and $H_2S$. Those compounds are eliminated from the benzol vapors in the column J as a result of the scrubbing action on the vapors passing upward in that column of the spent caustic liquor passing into the top of the column through the pipe K. The spent caustic liquor entering the still J includes benzol constituents which are vaporized in that still and mix with the benzol vapors liberated in the column D and purified in the still J. The benzol vapor mixture thus formed in the still J passes away from the latter through its top outlet $J^2$ and passes through the pipe L to the condenser M where it is condensed, and is separated from the accompanying water condensate as previously described.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In the continuous recovery of sulphuric acid and benzol from the spent acid residue of benzol washing operation, the method which consists in passing the residue downward through successive column still sections at successively lower levels, subjecting the spent acid residue to a boiling action and resultant agitation by injecting steam into the residue in each section, recirculating and further agitating the spent acid residue passing through each section as it passes through a flow path comprising a portion within said still section and a portion external to the still and subjecting the material moving through said external portion of the flow path to forces including an impelling force to maintain said flow, and forces sub-dividing and remixing the residue, passing vapors including benzol vapor and steam out of said column still at its upper end and passing the unvaporized portion of said residue out of said still at its lower end and separating dilute sulphuric acid from said residue portion.

2. A method as specified in claim 1, in which the forces to which the material passing through the flow path associated with each section are subjected repeatedly sub-divide the material and remix it after each sub-division.

3. In the continuous recovery of sulphuric acid and benzol from the spent acid and spent caustic residues of benzol washing operations, the method which consists in passing the spent acid residue downward through successive column still sections at successively lower levels, subjecting the spent acid residue to a boiling action and resultant agitation by injecting steam into the residue in each section, recirculating and further agitating the spent acid residue passing through each section by passing the residue through a continuous flow path comprising a portion within said still section and a portion external to the still, subjecting the material moving through said external portion of the flow path to an impelling force to maintain said flow, and to forces sub-dividing and remixing the material, passing the unvaporized portion of the residue away from the lower portion of said still and separating dilute sulphuric acid therefrom passing vapors including benzol vapor and steam from the upper portion of said column still into a bubble still, passing said caustic residue into the upper end of said bubble still and thereby separating sulphur compounds from the vapors received from said column still, separating benzol vapors from said caustic residue and separately withdrawing benzol vapors and unvaporized substances from the bubble still.

4. A column still comprising a plurality of superposed sections each including an upper gas space having an outlet at its top, a sub-jacent treating chamber open at its upper end to said space, and a discharge passage along side each chamber and open at its upper end to said gas space and open at its lower end to a gas space immediately beneath said section, the said discharge passage in the different sections being so disposed that the discharge passage of each upper section drains into the treating chamber of the immediately subjacent section, means for continuously withdrawing unvaporized material from a first portion of the treatment chamber of each section and agitating said material and returning it to a second portion of said section, said means comprising a conduit external to the kiln still and connected between the first and second portions of said treating chamber, a pump included in said conduit and operating to force material to blow through said conduit from said first to said second portion of the corresponding section and one or more mixing devices intermediate the ends of the conduit and each comprising a body formed with a plurality of passages displaced from one another and arranged to sub-divide and then re-mix the material moved through the device by the pump.

CARL OTTO.

REFERENCES CITED

The following references are of record in the file of this patent:

UNITED STATES PATENTS

| Number | Name | Date |
|---|---|---|
| 1,781,987 | Means | Nov. 18, 1930 |
| 1,916,349 | Van Ackeren | July 4, 1933 |
| 2,078,841 | Fauth | Apr. 27, 1937 |
| 2,177,734 | McNeil | Oct. 31, 1939 |
| 2,300,985 | Smith | Nov. 3, 1942 |

FOREIGN PATENTS

| Number | Country | Date |
|---|---|---|
| 624,071 | France | Mar. 29, 1927 |